United States Patent [19]
Piller

[11] 4,023,867
[45] May 17, 1977

[54] ROLLER BEARING FOR BACKUP ROLLERS IN MULTI-ROLL MILLS

[75] Inventor: Rudolf Piller, Schweinfurt, Germany

[73] Assignee: Kugelfischer Georg Schafer & Co., Schweinfurt, Germany

[22] Filed: Jan. 19, 1976

[21] Appl. No.: 650,288

[30] Foreign Application Priority Data

Jan. 31, 1975  Germany .......................... 2503916

[52] U.S. Cl. .................... 308/207 R; 308/236
[51] Int. Cl.² ......................................... F16C 35/06
[58] Field of Search ............... 308/207 R, 202, 236

[56] References Cited

UNITED STATES PATENTS

| | | | |
|---|---|---|---|
| 3,520,580 | 7/1970 | Simmers | 308/207 R |
| 3,733,108 | 5/1973 | Petros et al. | 308/236 |
| 3,912,345 | 10/1975 | Overton | 308/207 R |

Primary Examiner—Joseph F. Peters, Jr.
Assistant Examiner—Gene A. Church
Attorney, Agent, or Firm—Brumbaugh, Graves, Donohue & Raymond

[57] ABSTRACT

A backup roll assembly for use in a multiple roll mill, e.g. a Sendzimir roll mill, having a plurality of loose boundary rings connected in the manner of a bayonet lock with the outer bearing races.

5 Claims, 3 Drawing Figures

ROLLER BEARING FOR BACKUP ROLLERS IN MULTI-ROLL MILLS

The present invention relates to roller bearing assemblies for backup rolls, and, more particularly, to novel and improved roller bearing assemblies for backup rolls used in conjunction with work rolls in multiple roll mills, e.g., 20-roll mills, wherein said backup rolls consist of an inner race, roller bodies, a cage and an outer race which at the same time acts as a supporting roller.

Such installations, also known as Sendzimir roll mills, are predominantly used for the rolling of stainless steel slabs and special types of steel into bands. If very thin work rolls are used, a very high reduction of pass becomes possible for even very hard steel. However, in consideration of the very large roll forces, the thin work rolls must be well supported in order to prevent deflection.

In order to achieve a precise support of the work roll and intermediate rolls and at the same time a uniform distribution of the roll force over the backup rolls, a very high precision of the backup roller bearings is required. In addition, the space is laterally delimited through the support saddles placed between the backup rollers. High demands are made on the bearings because of the high loads, the required special precision and the limited space conditions.

Therefore, many attempts have been made to develop bearings, especially for 20-roll stands, which comply with these demands.

For example, a backup roller bearing is known wherein a multi-row baseless roller bearing is used. Thereby, the axial drive forces of the supporting rollers are transmitted by way of butting disks, also called thrust rings, to the support saddles between the bearings. It has been found that due to the high roll velocities at the outer race/thrust collar point of contact, considerable heat generation occurs so that in most cases sufficient lubrication of these sliding locations cannot be ensured. The consequences of such heat generation are heat cracking of the outer race coupled with frequent bearing failures and additional assembly work.

Double-row conical-roller bearings are likewise installed which transmit the drive forces from the outer race by way of rollers and the inner race to the saddles. However, conical-roller bearings when installed do not attain the required high radial load capacities such as attained by straight roller bearings. For equal dimensions, the capacities are about 30% below those of regular roller bearings.

Another possibility, i.e., to use roller bearings with fixed bases, cannot be pursued for several reasons. Firstly, manufacture of such larger rings with more precise edges is no longer economically feasible and, on the other hand, the fixed bases render assembly and disassembly of the bearings more difficult. Due to the irregular wear of the outer surface of the outer rings which, after all, are supporting rollers at the same time, the outer surfaces must be reground at regular intervals, towards which end disassembly of the bearings becomes necessary. The rollers must be individually removed from the cages and following regrinding of the outer ring must be inserted again, a time-consuming work which can be performed only by trained personnel.

The possibilities enumerated above as well as their shortcomings have been known for a long time. However, to date, no satisfactory solution has been found.

In accordance with the invention, there are provided on the outer race boundary rings which are positively connected in the manner of a bayonet or slide lock to the outer surfaces of the outer bearing race.

In a preferred embodiment, the bore surface in the zone of the side faces of the outer bearing race is provided with a circumferential groove whereby the outer groove edge is interrupted in sections uniformly over the periphery and the boundary rings are provided with annular radially directed projections in sections. By means of the bayonet lock thus produced, it becomes possible to have available during operations a safely functioning, high-load supporting roller bearing which in addition can be dismounted very rapidly in that only the bayonet lock need to be opened so that the outer bearing race can be removed. The set of rollers can thereby remain in the cage.

For reasons of safety, the boundary rings will be protected from unintentional separation by means of a protection against torsion. This may be attained, e.g., in that one boundary surface of the peripheral groove and the boundary surface of the projections adapted to engage it are rendered slightly wedge-shaped so that automatic locking is obtained. This also facilitates the centering of the boundary rings.

For a more complete understanding of the invention reference may be had to the following detailed description of an exemplary embodiment taken in conjunction with the following figures of the accompanying drawing, in which.

Figure 1:
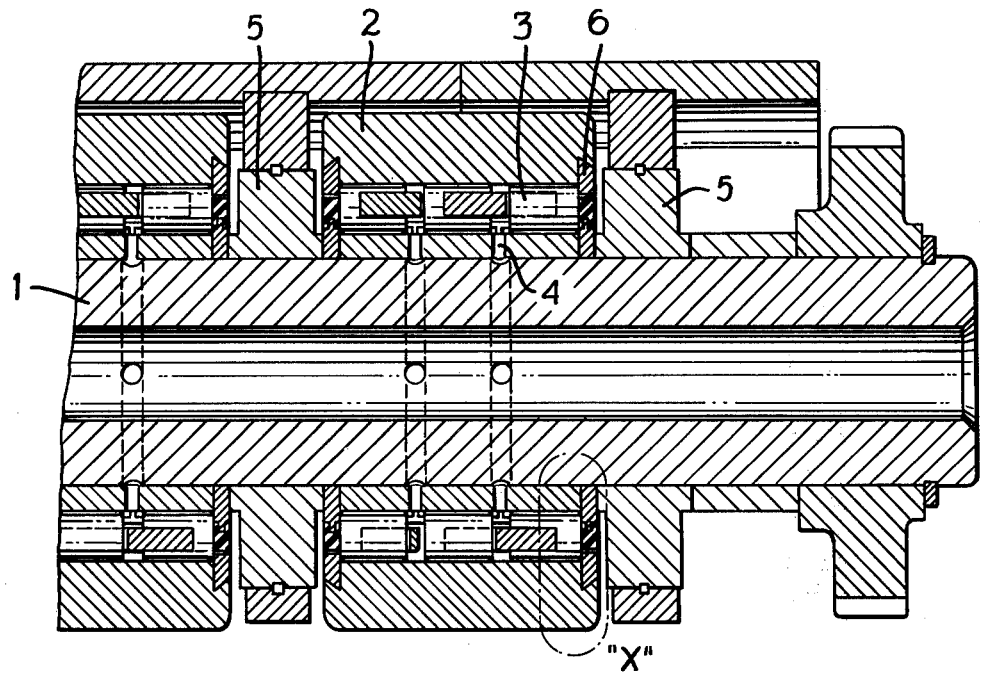
FIG. 1 shows a partial cross section through the backup roller bearing assembly in accordance with the invention.
Figure 1A:
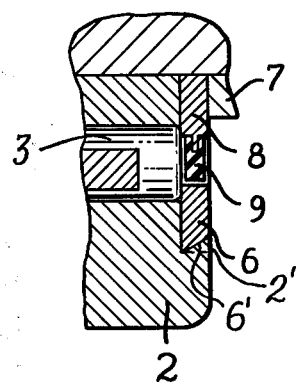
FIG. 1A is an enlarged sectional view of a portion of FIG. 1 contained within the dotted outline "X".
Figure 2:
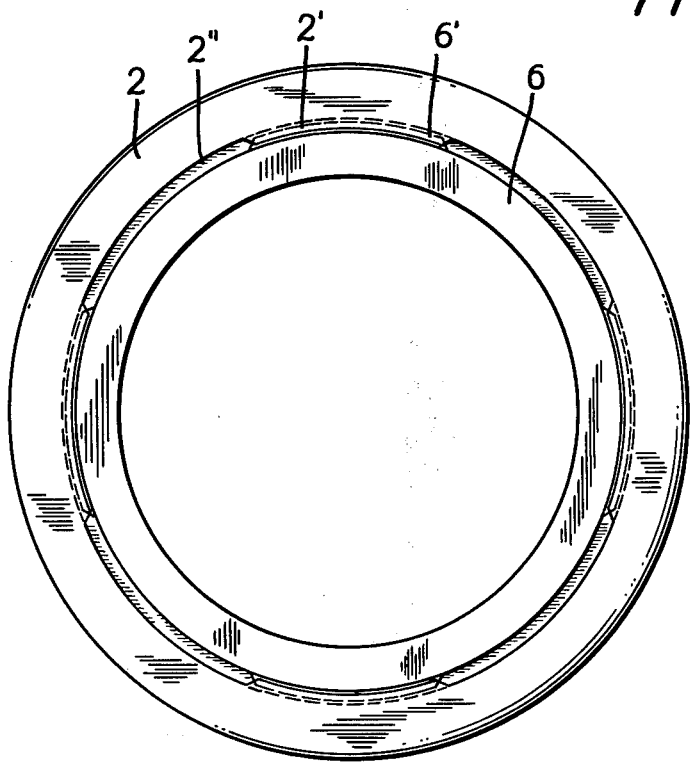
FIG. 2 shows one half of a side view of an outer race, in accordance with the invention, with a loose boundary ring.

On a common stationary axle 1, sometimes called the backing shaft, there are supported several supporting or backup rollers 2 forming an outer race for a plurality of cylindrical bearing rollers 3, which are provided with lubricants through lubricating bores 4 passing through the backup shaft 1 and the inner race 7 mounted thereon. To the right and left of each backup roller 2 is placed a support saddle 5. Loose boundary rings 6 are, as shown in FIG. 2, fixed with a positive lock to the outer race and thus facilitate transmission of the axial driving forces without problem. The groove edges 2' distributed in sections uniformly over the periphery and the radial projections 6', respectively, facilitate both rapid assembly and disassembly of the bearing. Inasmuch as the backup rollers 2 for reasons mentioned above must be reground from time to time, mounting and dismounting without problems offer special advantages. After the protective device against twisting has been loosened, the loose boundary rings 6 are turned in such a manner that the radial projections 6' and the discontinuous sections of the groove edges 2" coincide. Now the loose boundary rings 6 can be easily removed axially, and the backup roller 2 can be pulled off and reground while the inner race together with the roller set remains on the shaft 1. Assembly then takes place in reverse order.

As a protection against soiling, a rubber ring 9 is vulcanized onto the boundary rings 8 secured with the inner races 7.

Thus there is provided in accordance with the invention a bearing for backup rollers of multiple roll mills, such as 20-roll mills, which offers a higher life span, can be mounted and dismounted easily and offers the possibility of economical manufacture.

It will be understood by those skilled in the art that the above disclosed embodiment is merely exemplary and that it is susceptible of modification and change without departing from the spirit and scope of the invention.

Therefore, the invention is not deemed to be limited except as defined in the appended claims.

I claim:

1. In a roller bearing assembly for supporting rollers of multiple roll mills wherein the respective supporting rollers have an inner bearing race, roller bodies and an outer bearing race serving at the same time as the supporting roller, the improvement comprising loose boundary rings and bayonet lock means for releasably mounting and connecting said rings to respective opposite lateral ends of the outer bearing race, wherein the roller bodies are confined in operative relation between the inner and outer races.

2. A roller bearing assembly as claimed in claim 1, wherein said bayonet lock means comprises a peripheral groove on the portion of the opposite lateral ends of the outer race adapted to receive said respective boundary ring, said peripheral groove having spaced-apart interrupted edge portions uniformly distributed over the circumference thereof, and annular, radially directed projections on said boundary rings, said projections being complementary to said outer race interrupted edge portions to facilitate positioning and retention of said boundary ring within said peripheral groove.

3. A roller bearing assembly as claimed in claim 2, wherein said outer race peripheral groove increases in diameter in the direction toward the interior of the bearing assembly, and said boundary ring projections are correspondingly oppositely chamferred.

4. A roller bearing assembly as claimed in claim 1, further comprising means for inhibiting unintentional torsional movement of said loose boundary rings relative to the respective lateral ends of the outer bearing race.

5. A roller bearing assembly as claimed in claim 3, wherein at least one boundary surface of said peripheral groove and a complementary boundary surface of said boundary ring projections are wedge-shaped to inhibit unintentional torsional movement of said loose boundary rings relative to the respective lateral ends of the outer bearing race.

* * * * *